United States Patent [19]

Corte

[11] Patent Number: 5,511,573
[45] Date of Patent: Apr. 30, 1996

[54] CONTAMINATED VALVE CONTAINMENT DEVICE

[75] Inventor: Lawrence J. Corte, Lakewood, Colo.

[73] Assignee: K N Energy, Inc., Lakewood, Colo.

[21] Appl. No.: 327,594

[22] Filed: Oct. 24, 1994

[51] Int. Cl.[6] .......................... F16L 55/168; F16L 55/18; F16K 43/00
[52] U.S. Cl. .......... 137/15; 73/40.5 R; 73/49.1; 137/312; 137/315; 137/375; 138/97; 220/571; 277/34
[58] Field of Search ..................... 137/1, 15, 312, 137/314, 375, 378, 381, 382; 220/571; 138/97; 73/40.5 R, 49.1, 49.2, 49.3; 277/34

[56] References Cited

U.S. PATENT DOCUMENTS

| | | | |
|---|---|---|---|
| 441,141 | 11/1890 | Dalton | 137/312 |
| 1,646,013 | 10/1927 | Cornell, Jr. | 137/314 |
| 2,954,797 | 10/1960 | Dryer | 137/375 |
| 3,096,781 | 7/1963 | Roidt | 137/314 |
| 3,152,572 | 10/1964 | Allhoff, Jr. | 116/118 |
| 3,307,574 | 3/1967 | Anderson | 137/312 |
| 3,406,707 | 10/1968 | Schenck, Jr. | 137/375 |
| 3,450,151 | 6/1969 | Heutzenroeder | 137/375 |
| 3,940,940 | 3/1976 | Barrett | 137/312 |
| 4,278,115 | 7/1981 | Briles et al. | 137/312 |
| 4,292,992 | 10/1981 | Bhidé | 137/375 |
| 4,361,030 | 11/1982 | Heide | 73/40.5 R |
| 4,716,926 | 1/1988 | Jacobs | 137/375 |
| 4,805,444 | 2/1989 | Webb | 73/40.5 R |
| 4,947,888 | 8/1990 | Tanner | 137/312 |
| 4,961,442 | 10/1990 | Crespin et al. | 137/312 |
| 5,186,577 | 2/1993 | Reicin et al. | 405/52 |
| 5,313,991 | 5/1994 | Murray et al. | 137/312 |
| 5,379,810 | 1/1995 | Marino | 137/312 |

*Primary Examiner*—George L. Walton
*Attorney, Agent, or Firm*—Fields, Lewis & Rost

[57] ABSTRACT

A contaminated valve containment device is provided which includes a leak-proof housing that is attachable to a leaking pipe member to prevent migration of contaminants to the environment. Disposed inside the housing is a catch pan for collecting contaminates leaking from the pipe member. A drain tube is provided in communication with the catch pan to evacuate the collected contaminates. An environmentally safe container may be connected to the drain tube for storage of the contaminants. At least one removable panel is provided on the wall of the housing to allow access to the leaking pipe member for maintenance purposes. The removable panel may be secured to the housing by either leak-proof or non-leak-proof seals depending upon the toxicity of the liquid carried by the pipe member.

13 Claims, 4 Drawing Sheets

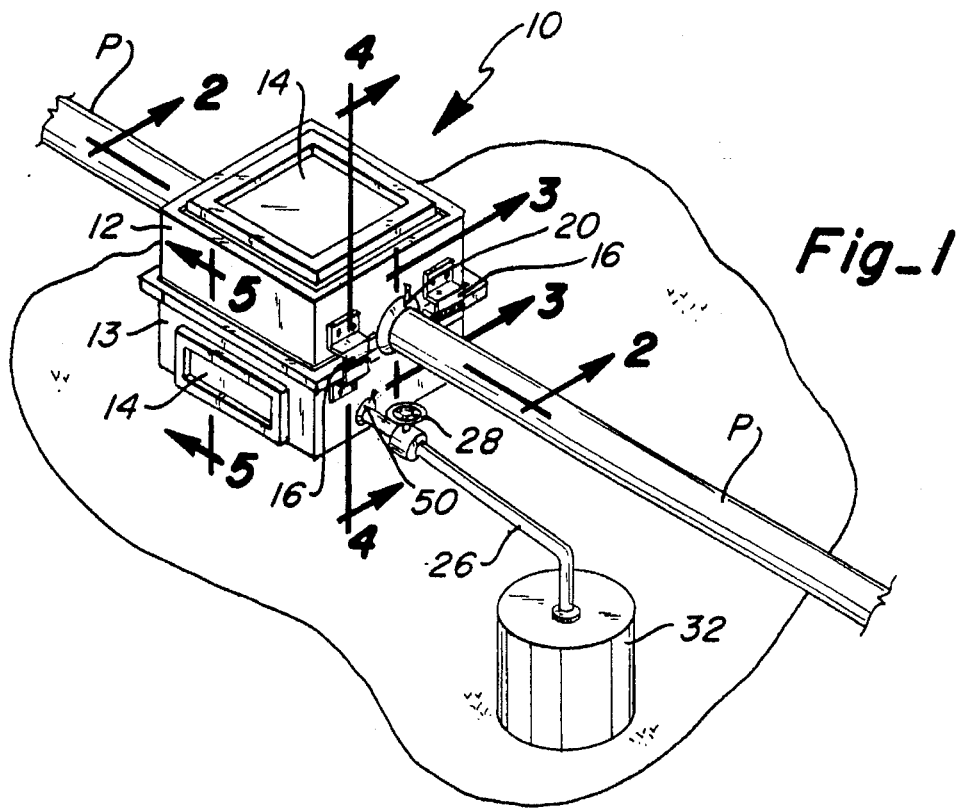
Fig_1
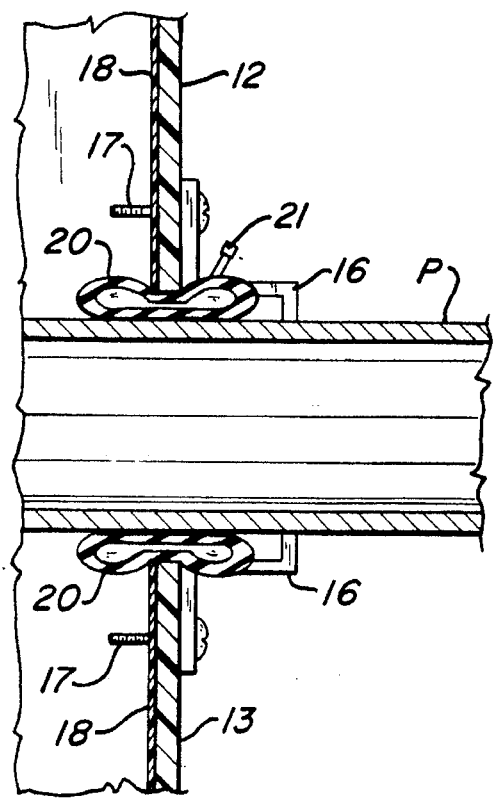
Fig_3

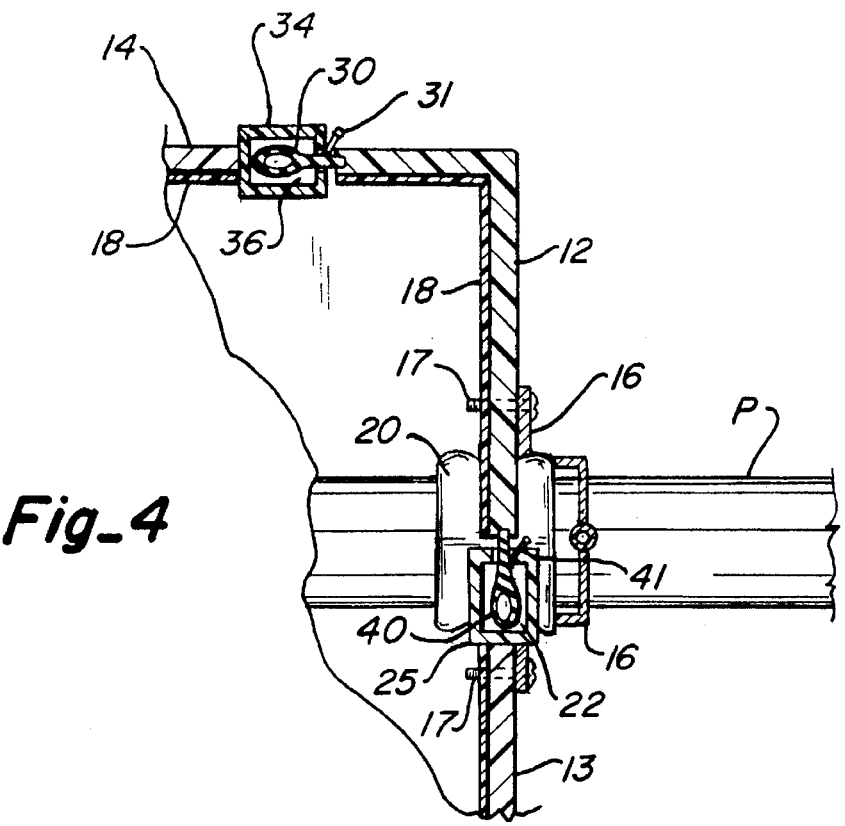
Fig_4
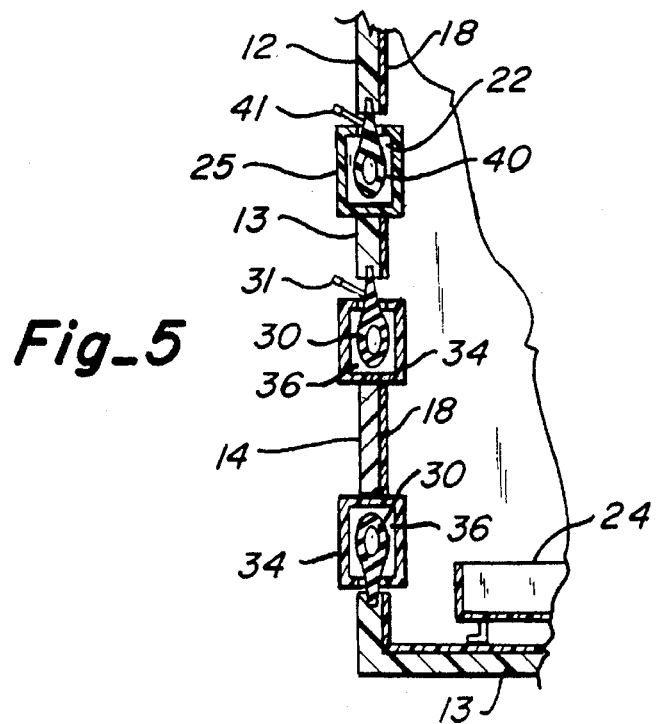
Fig_5

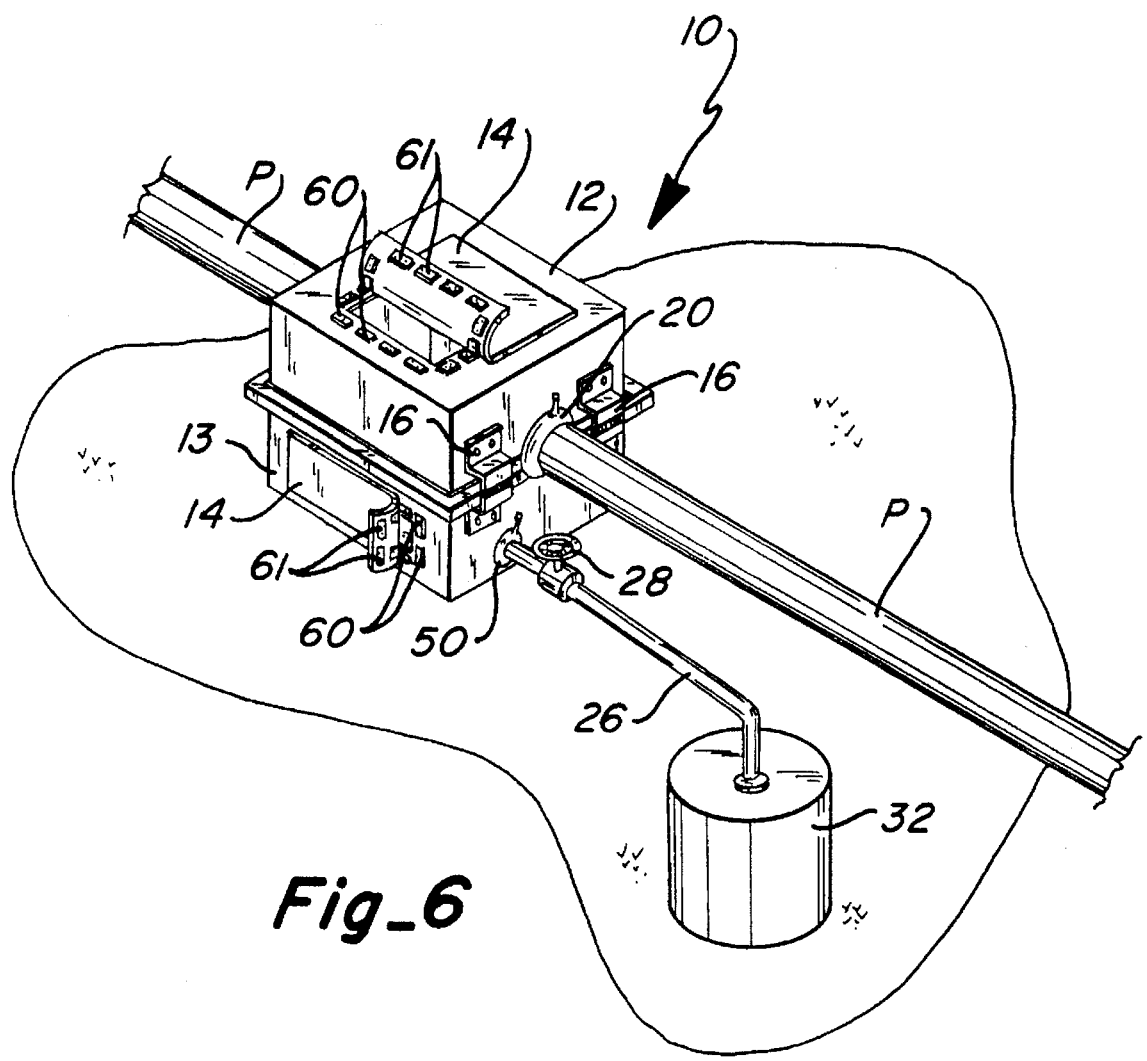
Fig_6

CONTAMINATED VALVE CONTAINMENT DEVICE

TECHNICAL FIELD

This invention relates to a device for containing spills from a leaking pipe member, such as a crude oil pipeline or chemical pipeline, and more particularly, to such a device which allows access to the leaking pipe member for maintenance purposes.

BACKGROUND ART

In recent years, there has been a heightened sense of awareness concerning the need to protect the environment from hazardous and toxic wastes. Due to strict regulation of chemical compounds that may pose a threat to human health or the environment, a need has developed to ensure that chemical contaminants do not enter the environment from such sources as leaking pipes or other industrial structures. One of the problems associated with containing spills from such industrial structures has been the need to design a leak-proof containment device to prevent the escape of contaminants, and to provide a means for repairing the leaking structure in an environmentally safe housing. This is particularly true with respect to crude oil pipelines used to convey oil from an oil well site to the refinery. The same considerations also are important with respect to the transmission of chemicals from one site to another.

One example of a device that can be used to house a leaking pipe member is disclosed in U.S. Pat. No. 4,716,926 to Jacobs, which is directed to insulating armatures and/or flange connections of a pipe wherein the escape of contaminants is prevented.

Another example of a device providing containment for liquid carrying equipment is found in U.S. Pat. No. 5,186,577 to Reicin, which discloses a housing surrounding a series of pipes and a leak-proof support bag which seals the pipes from the environment. Access to the pipes may be achieved through a top portion of the bag that then can be sealed to prevent migration of contaminants to the environment.

Yet another example of a device for containing spills is U.S. Pat. No. 4,401,141 to Dalton, which teaches a waste box for containing leaks from a valve assembly. The waste box includes two housing members that are joined to seal the valve from the environment. A drain hole is provided to allow the draining of fluid accumulating in the housing.

While each of these prior art references described above fulfills its intended purpose, none of these inventions disclose the novel invention disclosed herein. Specifically, none of the prior art references provide a convenient means for obtaining access to the leaking pipe member to perform maintenance, nor do these prior art references provide a leak-proof method for transferring the leaking fluid to an environmentally safe container. The present invention also includes other novel features that are more fully discussed below.

DISCLOSURE OF THE INVENTION

In accordance with this invention, a contaminated valve containment device is provided which includes a housing which encloses a section of leaking pipe. Leakage typically occurs at valves or other flanged pipe connections. Accordingly, the housing includes an upper and lower section which are joined in leak-proof fashion to completely seal the leaking pipe section from the environment and the interior space found within the housing is large enough to accommodate most common valves or flanged connections. The term "leak-proof" as used herein defines the ability of a structural member to prevent the leakage of contaminated material into the surrounding environment. The term "non-leak-proof" is defined by the ability of a structural member to substantially prevent leakage, but not to a degree such that there is absolute leakage prevention. The interior wall of the housing is lined with a non-reactive material to prevent degradation of the housing if exposed to highly reactive chemicals.

In the preferred embodiment, the upper and lower sections are connected at one end by means of a hinge. A leak-proof clamp or inflatable seal positioned between the pipe ends and the housing, and an inflatable seal positioned between the upper and lower housing sections seal the leaking pipe member from the environment.

At least one side wall of the housing includes a removable panel which allows access to the leaking pipe member. The removable panel may be secured to the housing by either leak-proof or non-leak-proof means. The leak-proof means may include an inflatable seal or a Zip-lock® type closure. Non-leak-proof means may include velcro tabs or a zipper.

A catch pan is positioned inside the housing for receiving leaking fluid. A drain tube communicates with the catch pan and carries the contaminant fluid to an environmentally safe container. The drain tube is also sealed with respect to the housing in the same manner as the pipe members to prevent migration of contaminants to the environment. A drain valve located on the drain tube controls the flow of contaminant fluids to the container.

This containment device requires a minimum amount of material to construct and provides an environmentally safe means for preventing contaminate spills. The access panels allow the leaking pipe member to be repaired without exposing the environment to potential contamination. The device can be used for temporary containment of leaking contaminants until the leaking pipe member can be properly serviced. Despite the simplicity of construction, this containment device is an effective means for protecting human health and the environment from contaminant materials.

Further advantages of this invention will become apparent from the description which follows, taken in conjunction with the accompanying drawings.

BRIEF DESCRIPTION OF THE DRAWINGS

FIG. 1 is a perspective view of the present invention showing the containment device installed on a section of pipe;

FIG. 3 is a greatly enlarged vertical section taken along line 3—3 of FIG. 1, showing the structural details of the sealing means used to seal the pipe ends from the environment;

FIG. 4 is an enlarged vertical section taken along line 4—4 of FIG. 1, showing the structural details of the sealing means between the upper and lower housing sections;

FIG. 5 is an enlarged vertical section taken along line 5—5 of FIG. 1, showing the structural details of the sealing means between a removable side panel and the housing wall; and FIG. 6 is a perspective view of the present invention showing an alternate embodiment of the containment device in which Velcro® tabs are used to secure the removable panels.

BEST MODE FOR CARRYING OUT THE INVENTION

Figure 2:
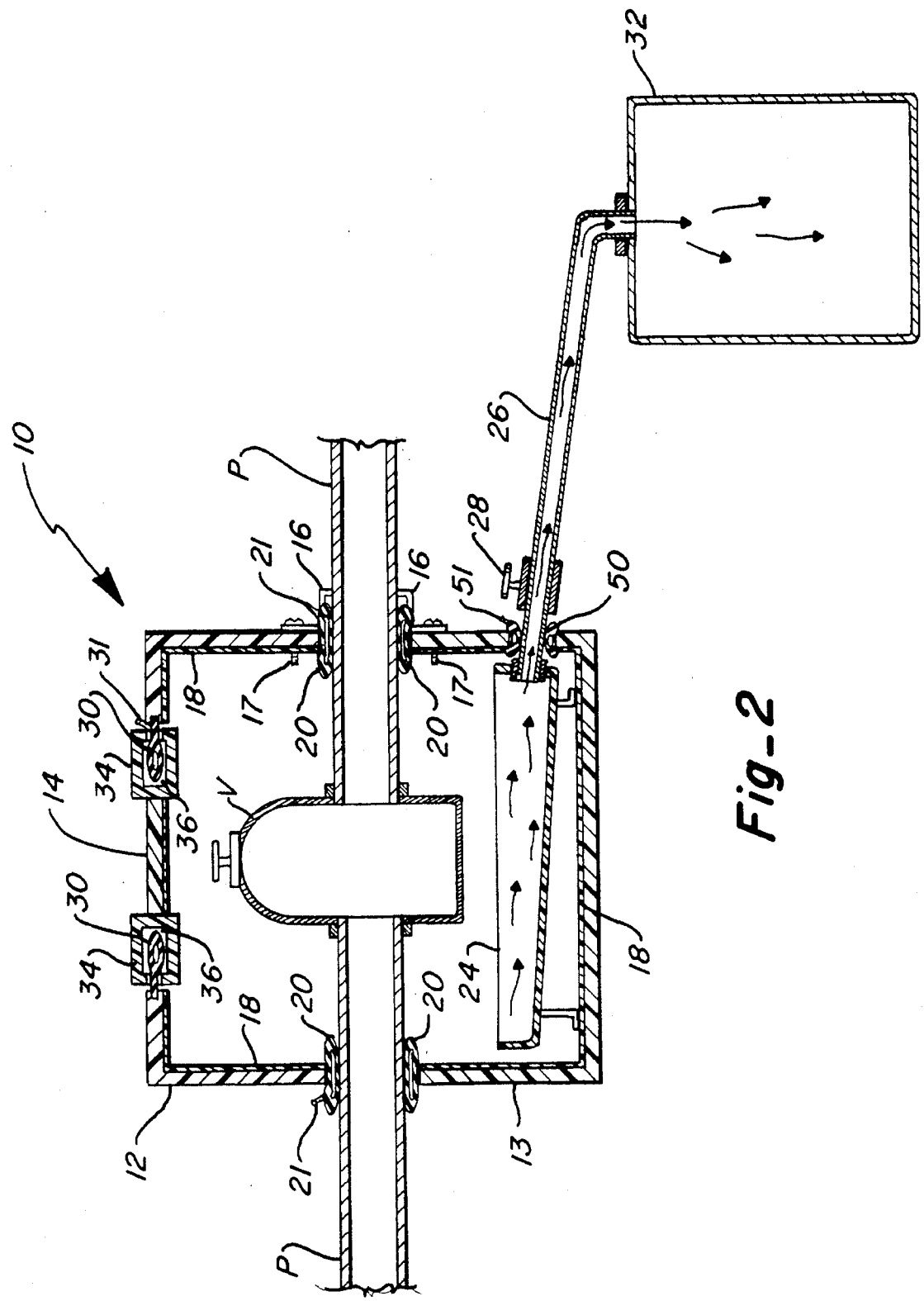
FIG. 2 is an enlarged horizontal section taken along line 2—2 of FIG. 1, showing the internal construction of the present invention.

As best seen in FIG. 1, a contaminated valve containment device in accordance with this invention is provided. The containment device 10 includes an upper housing section 12 and a lower housing section 13 that enclose a leaking section of pipe P. Sections 12 and 13 may be connected at one end by means of hinges 16 and hinge bolts 17. Sections 12 and 13 are sized such that the containment device 10 may adequately house a common valve V or flanged connection. The interior side of sections 12 and 13 are lined with a non-reactive material lining 18, such as polyeurothane, to prevent degradation of the housing when exposed to highly corrosive chemicals. At opposing ends of the containment device 10 is a pair of aligned openings for receiving the pipe member P. The containment device 10 is secured to the section of pipe by an inflatable seal 20 that surrounds the aligned openings, wherein seal 20 further provides a leak-proof seal between the interior of the housing sections and the environment. The seal 20 can be inflated through a conventional valve 21. The pressure of the inflated seal 20 against the pipe P rigidly secures the device 10 to the pipe. Since seal 20 is inflatable, it can be used with a number of differing pipe sizes. The housing sections 12 and 13 may also include an inflatable seal 40 positioned therebetween to prevent the leakage of contaminants.

As shown in FIG. 4, lower housing section 13 includes a split top wall 25 having an interior cavity 22 for receiving the inflatable seal 40 which is inflated through a conventional valve 41. When inflated, seal 40 completely fills cavity 22 providing a leak-proof seal.

A plurality of removable panels 14 may be formed integrally with housing sections 12 and 13 enabling access to the leaking pipe member for maintenance purposes. Although a top and side panel 14 are shown in the figures, it will be understood that the removable panels 14 may be spaced or arranged in the desired location to accommodate needed access to the leaking pipe member. For leaking pipe members not containing particularly toxic liquid, removable panels 14 may include a closing means constructed of Velcro® or other common materials for removably attaching the panels to the housing sections as shown in FIG. 6. For applications in which the pipe is carrying a highly toxic liquid, the removable panels 14 may be attached to the housing sections 12 and 13 by inflatable seals 30. As shown in FIG. 5, removable panels 14 include split walls 34 having interior cavities 36 for receiving inflatable seals 30. Seals 30 are inflated through conventional valve 31. Seals 30 are attached to the peripheries of the openings formed for the panels 14 on the housing sections 12 and 13. Removable panels 14 may be partially or completely removed in order to obtain access to the leaking pipe member.

As best seen in FIG. 2, disposed within the lower housing section 13 below the leaking pipe member P is a catch pan 24. The catch pan 24 is also constructed of non-reactive material like the lining of the housing sections. The catch pan 24 has a sloping surface that communicates with a drain tube 26. In turn, drain tube 26 communicates with an environmentally safe container 32, which can store a quantity of contaminant liquid. A drain valve 28 is provided on drain tube 26 in order to regulate the flow of contaminant liquid into container 32. A drain tube seal 50 is provided to ensure contaminant liquid does not escape through the opening in housing section 13 formed by drain tube 26. Drain tube seal 50 can accommodate differing sized drain tubes 26 due to its inflatability through conventional valve 51.

The installation of containment device 10 can be best understood by referring to FIG. 1. First, sections 12 and 13 are placed over the targeted pipe section. Seals 20, 30, 40 and 50 are then inflated to isolate the leaking pipe member from the environment. Seals 20, 30, 40 and 50 are provided with appropriate inflation stems 21, 31, 41 and 51, respectively, for attachment to a common inflation means such as a tire pump. Drain valve 28 is then adjusted to provide the desired rate of flow of contaminant liquid into container 32. Removable panels 14 may then be opened by partially deflating seals 30 in order to obtain access to the leaking pipe member to perform the needed maintenance.

FIG. 6 shows an alternative embodiment in which the removable panels 14 are secured to the housing sections 12 and 13 by non-leak-proof means such as a series of Velcro® tabs 60 positioned along the panel openings and corresponding tabs 61 positioned on edges of the panels 14.

It will be understood that the containment device disclosed is not limited to the specific structure set forth herein with respect to the seals 20, 30, 40 and 50. Depending upon the toxicity of the leaking fluid, the removable panels 14 may be sealed in any number of ways to accommodate safe access to the leaking pipe member P. For example, for pipes carrying non-toxic liquids, the panels 14 may be attached to the housing sections 12 and 13 by means of a zipper or plurality of snap fasteners. For toxic liquids, the panels 14 may be attached to the housing sections 12 and 13 by the inflatable seal set forth herein or some equally effective leak-proof seal such as a Zip-Lock® type closure. Additionally, seals 20, 30, 40 and 50 could include leak-proof adhesive tape or a liquid resistant putty compound that could be formed to match the specific opening to be sealed.

By this invention, an inexpensive yet effective device has been provided for containment of contaminant fluids emanating from a leaking pipe member without contaminating the environment. The device may be used as a temporary remedial measure to collect contaminant fluid, and may be further used to enable maintenance to be performed on the leaking pipe member. The containment device can be configured to completely isolate the leaking pipe member from the environment to contain toxic contaminants or partially isolate the pipe member when used to contain non-toxic contaminates.

This invention has been described in detail with reference to particular embodiments herein, but it will be understood that various other modifications can be effected within the spirit and scope of this invention.

I claim:

1. A device for containing spills from an enclosed leaking pipe member, said device comprising:

a housing with a pair of aligned openings for receiving the pipe member extending therethrough, said housing enclosing a length of the pipe member in leak-proof relation thereto;

at least one removable access panel positioned on said housing enabling access to the enclosed length of the pipe member wherein said housing remains enclosed around the length of the pipe in leak-proof relation thereto when said panel is removed for servicing any leaks that may occur along the enclosed length of the pipe member;

a means for catching leaking fluid from the pipe member, said catching means positionable within said housing along the length of said enclosed pipe member; and a drain means in communication with said catch means for removing fluid from said catching means to an external source.

2. Apparatus, as claimed in claim 1, further including:

a pipe sealing means attached to each of said aligned openings for sealing said housing against the pipe member in leak-proof relation thereto.

3. Apparatus, as claimed in claim 1, further including:

a valve connected to said drain means for controlling the flow of liquid from said drain means.

4. Apparatus, as claimed in claim 1, further including:

a container in communication with said drain means for receiving a quantity of fluid from said catch means.

5. Apparatus, as claimed in claim 1, wherein said access panel further includes:

a releasable sealing means for releasably sealing said access panel to said housing in leak-proof relation thereto.

6. A method for containing spills from a leaking pipe member and repairing the leaking pipe, said method comprising the steps of:

attaching a leak-proof housing around a section of the leaking pipe member to form a leak-proof barrier between the section of the leaking pipe member and the surrounding environment;

opening a leak-proof panel positioned the housing to obtain access to the section of the leaking pipe member wherein the leak-proof housing remains attached to the section of leaking pipe to continue to provide a leak-proof barrier;

providing means for draining the fluid leakage within the catch means conducting the necessary maintenance to repair the leaking pipe member section;

closing the leak-proof panel upon completion of the necessary maintenance of the leaking pipe member section; and removing the housing from the repaired section of the leaking pipe member.

7. A device for containing spills from a leaking pipe while performing maintenance on the pipe, said device comprising:

a leak-proof housing including an interior lining that encloses a section of leaking pipe, said housing having a pair of aligned openings for receiving the section of pipe extending therethrough;

a pipe sealing means positionable around each of said openings for creating a leak-proof seal between the pipe and said housing;

at least one removable access panel attached to said housing for providing access to the enclosed pipe leaking section to perform maintenance, said panel attached to said housing by a releasable panel sealing means, said housing having a panel opening corresponding to said access panel;

a catch pan having a sloped surface, said catch pan positionable within said housing for catching fluid leaking from the enclosed pipe leaking section and directing it to the lowest portion of said sloped surface;

a drain tube in communication with said lowest portion of said sloped surface of said catch pan and extending away from said housing through a drain opening positioned on said housing for removing fluid from said catch pan; and wherein said housing remains enclosed around the section of the leaking pipe when said at least one removable access panel is removed.

8. An apparatus, as claimed in claim 7, further including:

a sealed container in fluid communication with said drain tube for receiving a quantity of liquid from said catch pan.

9. An apparatus, as claimed in claim 7, further including:

a metering means attached to said drain tube for selectively metering the flow rate of liquid into said sealed container.

10. An apparatus, as claimed in claim 7, wherein said interior lining is made of a non-reactive substance resistant to reactive chemicals.

11. An apparatus, as claimed in claim 7, further including:

a drain tube seal attached to said housing for sealing said drain opening from the environment.

12. An apparatus, as claimed in claim 7, wherein said housing further includes:

an upper housing section;

a lower housing section having a split top wall forming a cavity; and a housing seal positioned between said upper and lower sections, said housing seal including an inflatable housing bladder attached to said upper section and insertable within said cavity of said lower section for joining said upper and lower sections in leak-proof relation thereto.

13. An apparatus, as claimed in claim 7, wherein said releasable panel sealing means includes:

a cavity formed on the periphery of said panel opening; and an inflatable panel bladder attached to said access panel along its periphery, said inflatable panel bladder insertable within said cavity of said panel opening for joining said panel to said housing in leak-proof relation thereto.

* * * * *